Figure 1:
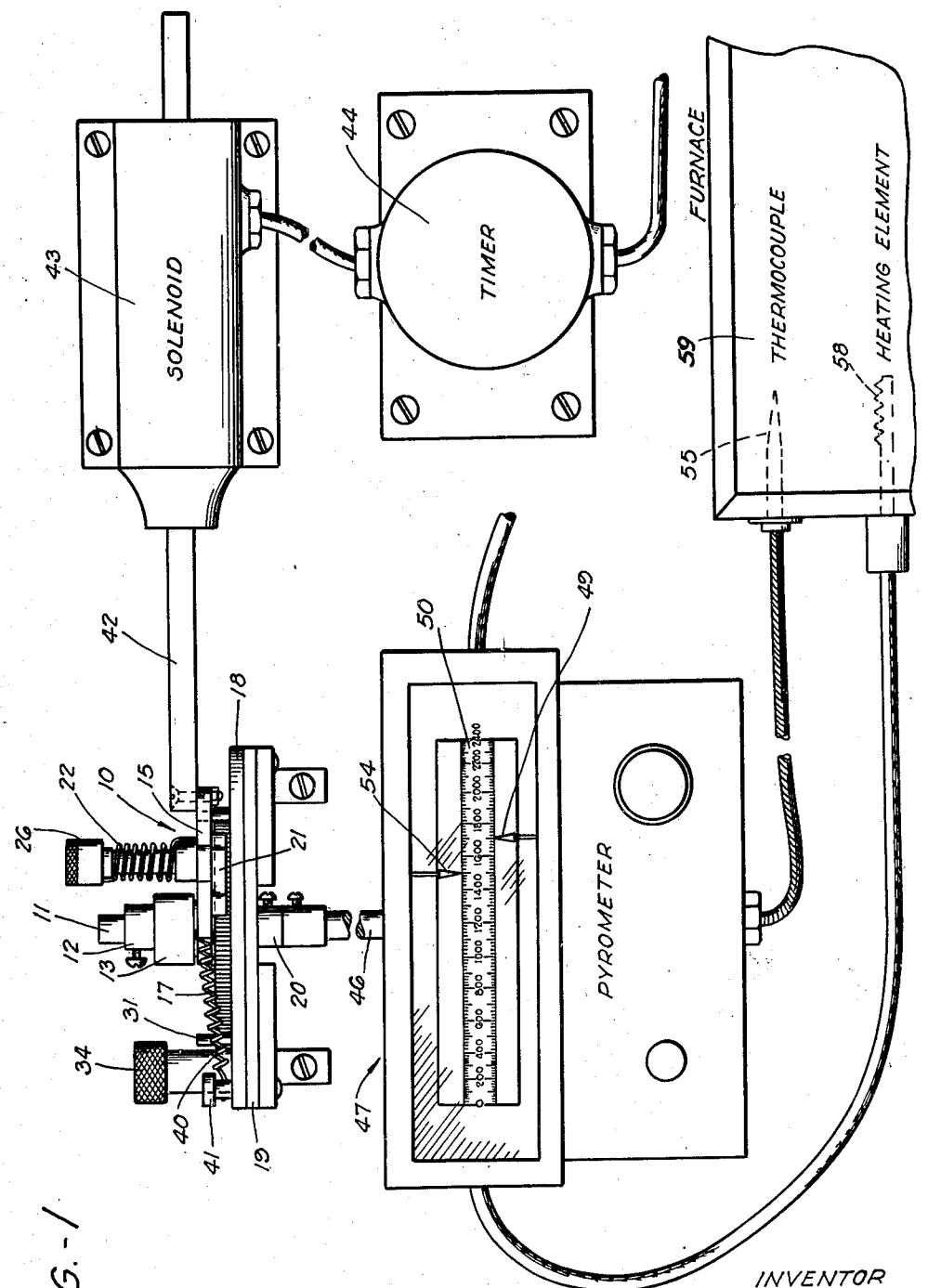

April 25, 1950 T. G. GILLEY 2,505,038
PROGRAM CONTROL APPARATUS
Filed Oct. 5, 1945 4 Sheets-Sheet 1

INVENTOR
T. G. GILLEY
BY
C. B. Hamilton
ATTORNEY

April 25, 1950 T. G. GILLEY 2,505,038
PROGRAM CONTROL APPARATUS
Filed Oct. 5, 1945 4 Sheets-Sheet 2

INVENTOR
T. G. GILLEY
BY C. B. Hamilton
ATTORNEY

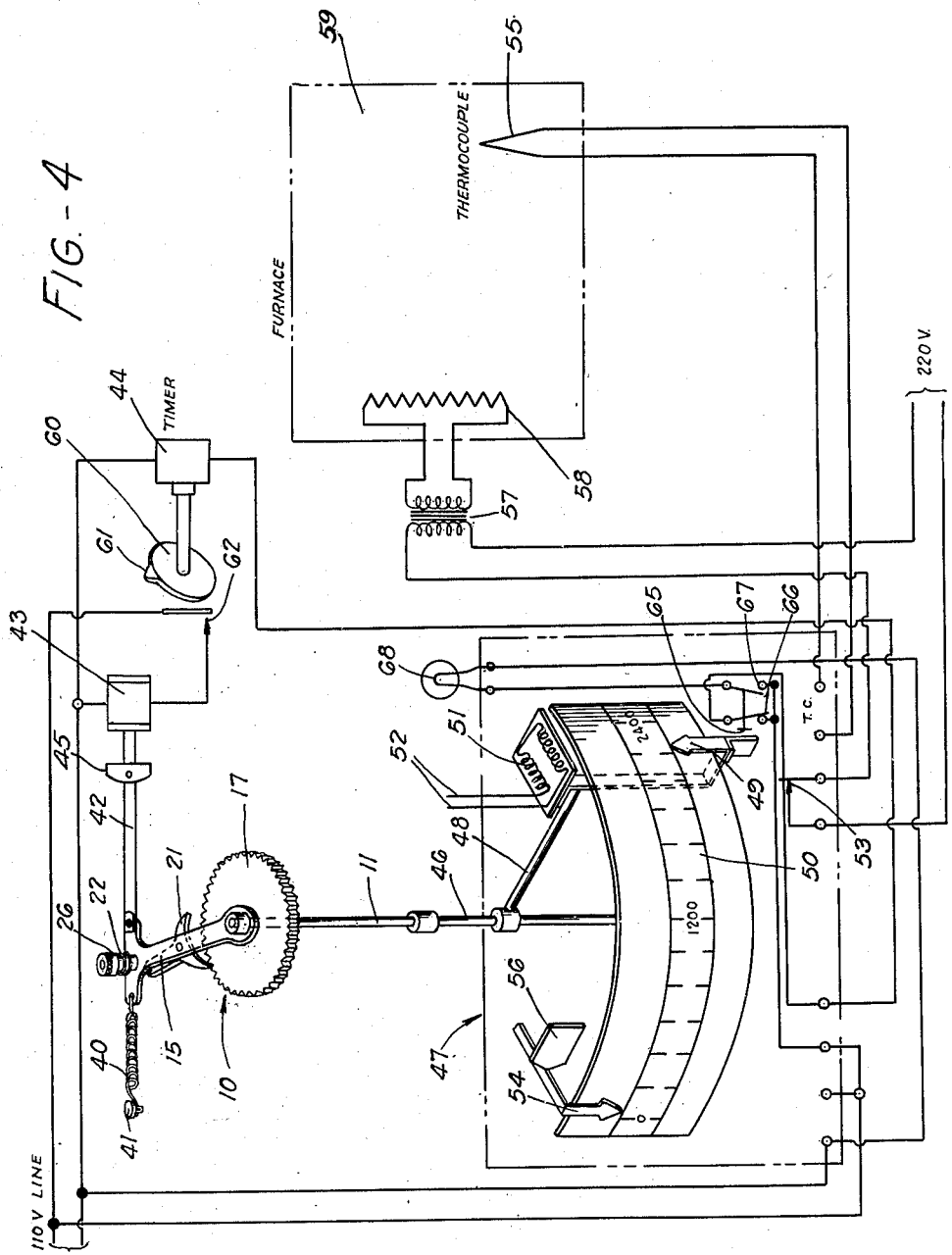

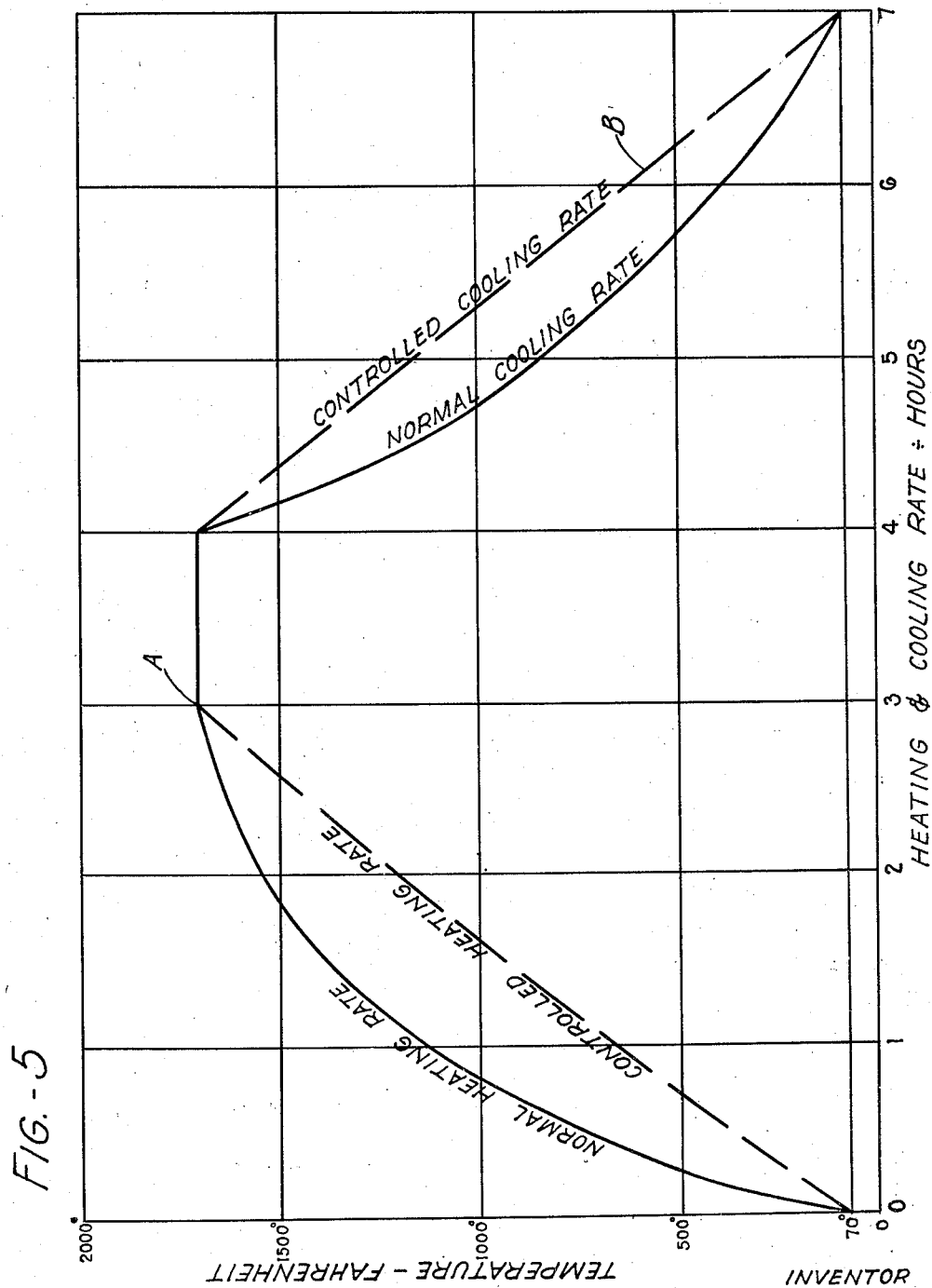

Patented Apr. 25, 1950

2,505,038

UNITED STATES PATENT OFFICE 2,505,038

PROGRAM CONTROL APPARATUS

Thomas Grady Gilley, Cranford, N. J., assignor to Western Electric Company, Incorporated, New York, N. Y., a corporation of New York Application October 5, 1945, Serial No. 620,606

6 Claims. (Cl. 236—46)

This invention relates to temperature control systems and more particularly to a program control apparatus or automatic rate of change controller for use with any timing mechanism.

The program control apparatuses heretofore available have had operating limitations which in some instances have restricted the use of the control equipment to a single specific program and, in other instances, it has been necessary to provide an individual cut cam for each different control service or to have an operator watch the controls and change the adjustment or control point at regular intervals.

An object of the present invention is to provide a simple device for controlling automatically the heating rate and/or cooling rate of a heating device at any predetermined value in degrees per unit of time.

In accordance with one embodiment, the present invention provides a control system having a program control apparatus for automatically changing at predetermined intervals the control point of pyrometers or other devices associated with a timer for a heat treating furnace wherein at predetermined intervals a solenoid operates an arm carrying a two-way pawl for selectively engaging a predetermined number of teeth of an adjustable ratchet wheel for operating the heat control in a selective direction in accordance with a predetermined program. The movement of the ratchet wheel is controlled by limit posts mounted on an index disc which is adjustable so that any desired rate of change can be accomplished and be readily readjusted for a new condition.

Figure 2:
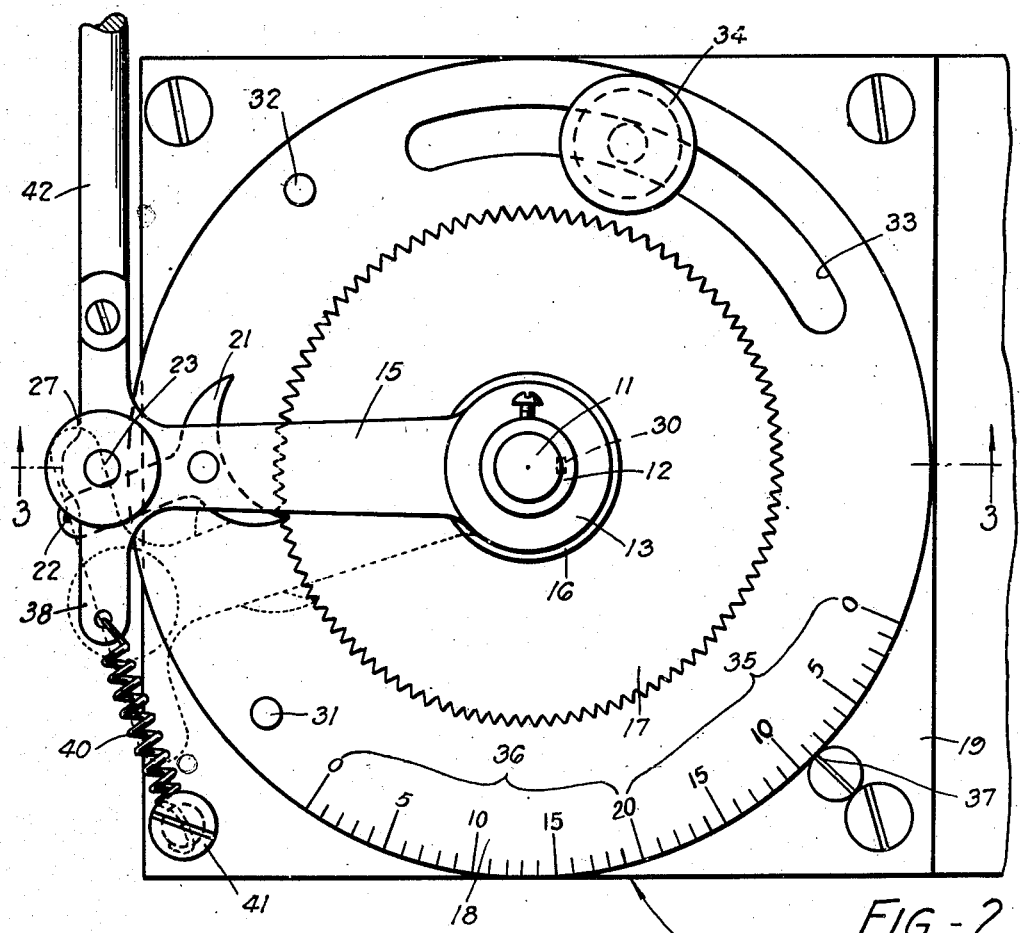
Figure 3:
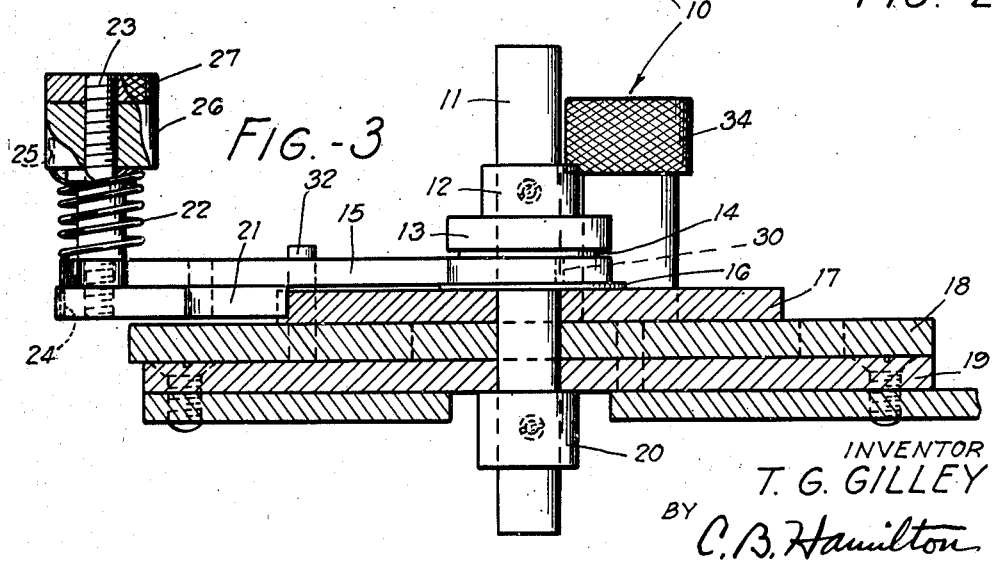

In the drawings:

Fig. 1 is a schematic diagram of the system and apparatus employed in practicing the invention, Fig. 2 is a plan view of the program control device, Fig. 3 is a cross-sectional view taken on line 3—3 of Fig. 2 looking in the direction of the arrows, Fig. 4 is an electrical diagram of the control system, and Fig. 5 is a chart showing a controlled heating rate and controlled cooling rate achieved with the program control device as compared with the normal or uncontrolled heating and cooling rates.

Referring now to the drawings wherein like reference numerals indicate the same parts throughout the several views, 10 designates an adjustable program control device or rate of change controller having a shaft 11 (Figs. 1, 2 and 3) onto which are slidably fitted a locking collar 12, a space sleeve 13, a washer 14, an arm 15, a washer 16, a ratchet wheel 17, an index disc 18, a base plate 19, and a second locking collar 20.

In operative association with the teeth of ratchet wheel 17 is a two-way or double leg pawl 21 which is pivotably mounted on the underside of the arm 15. The pawl 21 may be held operative either to the right or left by the tension applied by a coil spring 22. This spring is coiled about an upstanding threaded stud 23 secured to the outer end of the arm 15. The lower end of the coil spring 22 passes into an aperture 24 in the outer end of the pawl 21. The upper end of the coil spring 22 fits into a hole 25 of a nut 26 threaded on the stud 23. A knurled nut 27 (Fig. 3) serves to lock the nut 26 and spring 22 in a desired position. Rotation of the nut 26 counterclockwise turns the spring 22 and the pawl 21 in the same direction so that the lower leg of the pawl engages the teeth of the ratchet wheel 17 as shown in Fig. 2. Clockwise rotation of the nut 26 turns the spring 22 and the pawl 21 clockwise so that the upper leg of the pawl then engages the teeth of the ratchet wheel.

The ratchet wheel 17 is secured to the shaft 11 by a key 30. Positioned beneath the ratchet wheel and freely rotatable about the shaft 11 is the index disc 18 which carries two stop pins 31 and 32 for limiting the arcuate movement of the arm 15 and its associated pawl 21. The position of these stop pins 31—32 is varied by rotating the index disc 18 about the shaft 11 within the limits of an arcuate slot 33 in the index disc. A knurled headed screw 34 is threaded into the base plate 19 and cooperates with the arcuate slot 33 to clamp the index disc 18 in an adjusted position.

As shown in Fig. 2, the index disc 18 is provided with a scale 35 extending clockwise from a zero (0) mark and also with a similar scale 36 extending clockwise from the left end of the first scale. These scales are associated with a fixed index mark 37 on the base plate 19 and are used to determine the position of the disc 18 and the stop pins 31—32 to control the distance and direction of movement of the arm 15 and its pawl 21.

The outer end of the arm 15 is provided with a T-shaped integral portion 38. Secured to one end of this portion 38 is an end of a coil spring 40 which has its other end secured to a post 41 fixed to the base plate 19. This coil spring 40 returns the arm 15 to normal position as indicated in dotted lines in Fig. 2. The other end of the T portion of the arm 15 is secured to a movable core 42 of a solenoid 43 having a stop 45 on the core 42 (Figs. 1 and 4). The solenoid is controlled by a conventional timing mechanism 44. With the solenoid core 42 and spring 40 connected to the T-shaped portion 38 as shown in Fig. 2, the stop pin 31 is used in conjunction with the stop 45 on the solenoid 43 to control the degree of movement of arm 15 and pawl 21 as indicated on the scale 35 in both heating and cooling phases. However, as a matter of structural convenience the mechanical construction may be reversed; that is, the movable core 42 of the solenoid 43 may be connected to the other end of the T-shaped portion 38 from that shown in Fig. 2 and the spring 40 may be connected to the end of portion 38 now shown connected to the solenoid core 42 whereby stop pin 32 will now serve to limit the movement of arm 15 and pawl 21 in conjunction with the stop 45 on the solenoid core 42 as indicated on the scale 36 in both heating and cooling phases.

The lower end of shaft 11 of the program control device 10 is secured to a control point setting shaft 46 (Fig. 4) of a millivolt type indicating and controlling pyrometer 47. This pyrometer may be provided with a radio frequency type control circuit or the pyrometer may be any other type of commercially available temperature controller. Secured to the setting shaft 46 and rotatable therewith is an arm 48 carrying a pointer 49 which cooperates with a scale 50 calibrated in degrees of temperature. Also mounted on and movable with the pointer arm 48 is a coil 51 connected to a control circuit 52 of the pyrometer 47.

A temperature indicating pointer 54 of the pyrometer is controlled by a thermocouple 55 positioned in a furnace 59 whose temperature is to be controlled. The pointer 54 carries a metal flag 56 which, when it enters the coil 51, sets up an electrical current in the control circuit 52. This control circuit then operates a relay (not shown but which is standard equipment in pyrometers) to open contacts 53 to disconnect power from a transformer 57 which supplies current to a heating unit 58 in the furnace 59. The furnace temperature then drops slightly and the thermocouple circuit causes the temperature indicating pointer 54 to move clockwise (Fig. 4) thereby carrying the flag 56 away from the coil 51 so that the control circuit 52 is not operated thus permitting the pyrometer relay to close the load circuit through contacts 53 to the transformer 57. Energization of the transformer transmits electric current to the heating unit 58 in the furnace. The furnace again heats up until the metal flag 56 again causes operation of the control circuit 52 to disconnect power from the heating unit in the furnace. Again the metal flag is moved from the coil 51 to cause reheating of the furnace and the above procedure continues until after the passage of a predetermined time when the timer 44 has rotated its insulated cam 60 to bring its lobe 61 into position to close a normally open electrical contact 62. The closing of this contact energizes the solenoid 43 which operates the pawl 21 to rotate the shafts 11 and 46 and move the pointer arm 48 and its control coil 51 a predetermined number of degrees on the scale 50 to a new setting whereupon the preceding operations are repeated.

Referring now to the chart of Fig. 5 the operation of the program control apparatus will be described in obtaining the controlled heating rate and the controlled cooling rate indicated thereon. To set the program control device 10 to obtain the controlled heating rate shown in Fig. 5, it will be assumed that each tooth on the ratchet wheel 17 represents one division on the pyrometer scale 50, which division equals twenty (20) degrees Fahrenheit. To increase the heating rate 180° or 9 teeth on the ratchet wheel 17 every twenty (20) minutes, the index disc 18 is set so that the index mark 37 (Fig. 2) is in alignment with the number 9 position on the scale 35. The knurled headed screw 34 is then turned to clamp the index disc 18 in this set position.

The nut 26 on the control apparatus 10 is then turned counterclockwise to bias the spring 22 in that direction so that the lower leg of the pawl 21 engages the teeth of the ratchet wheel as shown in Figs. 2 and 4. With the timer 44 adjusted to close contact 62 every twenty (20) minutes the solenoid 43 will be energized three times every hour. Each operation of the solenoid 43 moves the pawl 21 idly over nine (9) teeth on the ratchet wheel in a clockwise direction from the stop pin 31. The lobe 61 of cam 60 immediately rotates out of contact closing position and permits contact 62 to open to deenergize solenoid 43. When this occurs, spring 40 pulls the arm 15 and pawl 21 in a counterclockwise direction thereby rotating ratchet wheel 17, and shafts 11 and 46 counterclockwise until arm 15 engages stop pin 31. This counterclockwise rotation of shaft 46 moves arm 48, pointer 49 and coil 51 upscale 180 degrees to obtain a higher temperature in the furnace.

The metal flag 56 is then moved away from the coil 51 and control circuit 52 operates the pyrometer relay to close the contacts 53 to supply power to the electrical heating unit 58 as hereinbefore described. The heating unit 58 continues to heat the furnace until the temperature indicating pointer 54 carries the metal flag 56 into the control coil 51. Again the control circuit 52 disconnects power from the furnace heating unit by opening the contacts 53. The furnace is thus maintained at the temperature at which the pointer 49 and coil 51 is set until the passage of another twenty (20) minutes when the timer 44 again closes contact 62 to energize the solenoid 43 to effect the turning of the ratchet wheel 17 and setting shaft 46 through another nine divisions (180°) on the scale 50. Thus the pointer 49 and the control coil 51 is set upscale another 180° to a higher temperature indication whereupon the metal flag 56 is moved away from coil 51 and the control circuit 52 again causes the closing of contacts 53 to supply power to the heating unit 58 in the furnace.

These intermittent heating periods and the step by step movements of the setting control coil 51 continues every twenty (20) minutes until the temperature point A is reached on the chart of Fig. 5. When the temperature in the furnace reaches the point A the timer mechanism 44 is disconnected so that the solenoid 43 and the control device 10 is rendered non-operative. This is accomplished by the provision of a microswitch 65 which is adjustable into any predetermined position along the arcuate path of travel of the pointer 49. With the microswitch 65 positioned at the point corresponding to the temperature A of Fig. 5, the pointer 49 operates the microswitch at that point to open its contacts 66 to disconnect power to the timer mechanism 44. The microswitch 65 also closes another set of contacts 67 which lights a pilot light 68 to notify the attendant that the A temperature has been reached in the furnace.

The attendant then permits the temperature A to be maintained for a given period of time and then he adjusts the program control device 10 to control the cooling rate in accordance with line B on the chart of Fig. 5.

To set the program control device 10 to obtain the controlled cooling rate B (Fig. 5), the lock nut 27 (Fig. 3) is loosened and the nut 26 is turned clockwise to bias the spring 22 in the same direction which causes the upper leg of pawl 21 to engage the teeth of ratchet wheel 17. Lock nut 27 is then tightened to hold the pawl 21 in this adjusted position.

Knurled headed screw 34 is then loosened and index disc 18 is set at a point on scale 35 relative to the fixed index mark 37 on the base plate 19 according to the required number of teeth on the ratchet wheel which determines the number of degrees cooling rate per given unit of time. That is, if the disc 18 is set so that index point "10" on the scale 35 is in alignment with mark 37, then stop post 31 will be positioned to limit the counterclockwise movement of arm 15. With this adjustment the program control device 10 is now set to move the pyrometer control pointer 49 and control coil 51 down the scale 50 at the rate of ten (10) divisions or 200° for each stroke of the solenoid 43 at predetermined intervals as determined by the operation of the timer mechanism 44, the solenoid 43, the rate of change controller 10 and pyrometer 47 in a manner similar to that described in obtaining the controlled heating rate of Fig. 5.

If a particular furnace is normally manually controlled, then the automatic program control device or rate of change controller 10 may be connected to a variable transformer, a rheostat, a reactor or other voltage changer to control the voltage applied to the heating unit.

What is claimed is:

1. In a temperature control system, a heating means, a pyrometer connected to the heating means and having a settable control point for controlling the heating means, and a rate of change controller for setting the temperature control point of the pyrometer at predetermined intervals in accordance with desired programs, said controller comprising a ratchet wheel for changing the control point of the pyrometer, a two-way pawl for operating the ratchel wheel in a clockwise or counterclockwise direction to decrease or increase the temperature by changing the said control point, means for biasing the pawl to operate the ratchet in a given direction, an adjustable means for controlling the extent of movement of the pawl, and means for operating the pawl at predetermined intervals to move the ratchet wheel through a given distance as determined by the said adjustable control means so as to vary the position of the said control point.

2. In a temperature control system, a temperature controller including a control pointer for regulating the heat to a means to be controlled, a rate of change controller including a pawl and a ratchet for automatically setting the control pointer to different control temperatures in accordance with a predetermined program, a solenoid for operating the rate of change controller, an adjustable electrically controlled timer for operating the solenoid at predetermined intervals, and means positioned adjacent the temperature controller for rendering the timer non-operative when a predetermined adjustment is attained by the control pointer.

3. In a movement mechanism, a timing mechanism, an operating means controlled by the timing mechanism at predetermined intervals, a two-way pawl actuate by the operating means, a ratchet actuated by the pawl, means for biasing the pawl to operate the ratchet in one of two directions, and adjustable means for controlling the movement of the pawl so that any desired degree of movement can be achieved by the ratchet.

4. A rate of change controller comprising a base, a shaft rotatably mounted therein and adapted to be connected to a means to be controlled in accordance with a predetermined program, means for actuating the shaft, timing means for controlling said actuating means, an adjustable means rotatably mounted on the shaft and controlling the extent of movement of the actuating means, and means for holding the adjustable means in an adjusted position relative to the base to move the shaft through a desired fixed distance.

5. A program controller including a base, a shaft rotatably mounted on the base, an index disc mounted on the shaft and rotatable relative thereto, a plurality of stop pins secured to the disc, means for clamping the disc to the base in predetermined positions, a ratchet wheel keyed to the shaft, an arm rotatably mounted on the shaft, a two-way pawl pivotally mounted on the arm to engage the teeth on the ratchet wheel, spring means for biasing the pawl to rotate the ratchet wheel either clockwise or counterclockwise, and means for moving the arm and pawl carried thereby to rotate the ratchet wheel and shaft a predetermined distance as determined by the position of one of the stop pins.

6. In a temperature program controller, a heating means, a pyrometer connected to the heating means and having a settable control pointer for controlling the heating means, and a rate of change controller for setting the temperature control pointer at predetermined intervals in accordance with desired programs, said rate of change controller comprising a ratchet wheel for changing the setting of the control pointer of the pyrometer, a two-way pawl for operating the ratchet clockwise and counterclockwise to decrease or increase the temperature by changing the setting of the control pointer, spring means for biasing the pawl to rotate the ratchet clockwise or counterclockwise, means for locking the spring means in a predetermined biased position, adjustable means for controlling the movement of the pawl to vary the extent of movement of the ratchet wheel and the movement of the said pointer to control the heating means, and electrically controlled timing means for operating the pawl and ratchet at predetermined intervals.

THOMAS GRADY GILLEY.

REFERENCES CITED

The following references are of record in the file of this patent:

UNITED STATES PATENTS

| Number | Name | Date |
|---|---|---|
| 10,394 | Page | Jan. 3, 1854 |
| 1,557,093 | Roesch | Oct. 13, 1925 |
| 1,715,987 | Brown | June 4, 1929 |
| 1,946,280 | Harrison | Feb. 6, 1934 |
| 1,964,909 | Garity | July 3, 1934 |
| 2,213,908 | Goldstein | Sept. 3, 1940 |
| 2,232,202 | Bean | Feb. 18, 1941 |
| 2,259,877 | Cary | Oct. 21, 1941 |
| 2,279,504 | Persons | Apr. 14, 1942 |
| 2,300,954 | McMaster | Nov. 3, 1942 |
| 2,304,514 | Sutton | Dec. 8, 1942 |
| 2,348,497 | Ray | May 9, 1944 |
| 2,377,551 | Harvey | June 5, 1945 |